United States Patent [19]
Ishikawa et al.

[11] Patent Number: 4,477,167
[45] Date of Patent: Oct. 16, 1984

[54] PROTECTIVE DEVICE FOR AUTOMATIC FOCUSING CAMERA

[75] Inventors: Norio Ishikawa, Osaka; Yukio Miki, Sakai, both of Japan

[73] Assignee: Minolta Camera Kabushiki Kaisha, Osaka, Japan

[21] Appl. No.: 442,187

[22] Filed: Nov. 16, 1982

[30] Foreign Application Priority Data

Nov. 16, 1981 [JP] Japan .................. 56-183948

[51] Int. Cl.³ .............................................. G03B 3/00
[52] U.S. Cl. ..................................... 354/400; 354/406
[58] Field of Search .................. 354/25 R, 25 N, 195, 354/400

[56] References Cited

U.S. PATENT DOCUMENTS

| 4,160,590 | 7/1979 | Reynard | 354/195 |
| 4,178,087 | 12/1979 | Shenk et al. | 354/195 |
| 4,182,563 | 1/1980 | Biber et al. | 354/195 |
| 4,199,244 | 4/1980 | Shenk | 354/195 |
| 4,200,378 | 4/1980 | Shenk | 354/25 |
| 4,238,143 | 12/1980 | Shenk | 354/195 |
| 4,239,354 | 12/1980 | Shenk | 354/195 |
| 4,294,531 | 10/1981 | Shenk | 354/195 |
| 4,309,098 | 1/1982 | Shenk | 354/195 |
| 4,348,089 | 9/1982 | Shenk | 354/195 |

Primary Examiner—Russell E. Adams
Attorney, Agent, or Firm—Jackson, Jones & Price

[57] ABSTRACT

An automatic focusing camera which can drive an objective lens to a focus position includes a sensor arrangement that is capable of determining when the focusing lens is physically held or is being driven beyond its operative range. The direction of movement can be stored in memory when the motor is de-energized and a comparison can be made with a new focusing signal on a different object to reactivate the focusing system. Additionally, any friction binding of the gear train can be automatically released by a reverse driving of the motor upon determining of a jam condition.

12 Claims, 10 Drawing Figures

PROTECTIVE DEVICE FOR AUTOMATIC FOCUSING CAMERA

BACKGROUND OF THE INVENTION

1. Field of the Invention

The present invention relates to a camera automatic focusing device which drives the camera objective lens to its in-focus or best-focus position by a single reversible motor and more particularly to apparatus to prevent any overload conditions.

2. Description of the Prior Art

In a camera system such as of a single lens reflex camera wherein the objective lens is changeable, various lenses such as a wide angle lens, a standard lens, telephoto lens, macro lens, etc. are adapted to be selectively and detachably mounted on a single camera body. The lenses each have closest focusable distances determined from their constructions and which are not necessarily the same. Moreover, the lenses have different amounts of the movement of their focusing lens elements for focusing, i.e. the amounts of the movement in the focusable range from the closest focusing position to the infinity focusing position. Picture taking or photographing lenses are usually constructed such that when the focusing lens element adapted to be moved along the optical axis for focusing reaches the closest focusing position, the element is prevented from moving further by a prevention mechanism provided in a lens barrel. The focusing lens element is also prevented from moving beyond the infinity focusing position by a prevention mechanism provided in a lens barrel. In an automatic focusing system wherein the focusing lens element arranged as mentioned above in a picture taking lens is adapted to be driven, for automatic focusing, along the optical axis of the lens by an electric motor mounted within the camera body, certain problems relating to an overload condition can occur. When a target object on which the picture taking lens are to be focused is at a distance closer to the camera than the closest focusable distance, the motor in the camera body still tends to drive the focusing lens element beyond the closest focusing position. As a result, the focusing lens element remains stopped at the closest focusing position, while the motor is forced to stop by the prevention mechanism or continues to be driven with a sliding clutch mechanism between the motor and the focusing lens element. In both cases, the load to the motor is increased by the stoppage of the focusing lens element and electrical current continues to flow into the motor while the focusing lens element is being stopped, resulting in such problems as motor damage and a large consumption of power from a motor driving power source. A similar situation will occur when an object to be focused is far position beyond the furthest focusable distance adapted for close-up photography wherein an intermediate ring is mounted between a camera body and a picture taking lens or a close-up lens is mounted at the front of a picture taking lens.

SUMMARY OF THE INVENTION

An object of the present invention is to provide a simple and compact construction which is used in an automatic focusing device of the type wherein a motor arranged in a camera body drives a focusing element in an objective lens mounted on the camera body along the optical axis of the lens and which is free from creating any motor damage and large power consumption even when a focusing lens element is prevented by a prevention mechanism from moving beyond the closest focusing position or the infinity focusing position.

Another object of the present invention is to provide an automatic focusing device which is constructed so as to interrupt power supply to the motor and to stop the rotation of the motor upon the arrival of the focusing element at either the closest or infinity focusing position.

Yet another object of the present invention is to provide such a construction which restarts the driving of the motor for automatic focusing when the object to be focused on is changed by, for example, the photographer changing the direction of the camera and the camera-to-object distance falls within the automatic focusable range, after the motor was stopped.

To attain the above-mentioned objectives, the automatic focusing device according to the present invention is characterized in that an encoder is provided in the camera body for generating a train of pulses of a number in accordance with the amount of the movement of a lens element which is moved by a motor for automatic focusing along the optical axis of the objective lens, and that motor overload is detected by detecting whether the intervals of the pulses from the encoder are longer or not than a predetermined period so that power supply to the motor is interrupted instantaneously upon detection of the overload.

DESCRIPTION OF THE PREFERRED EMBODIMENTS

Figure 1:
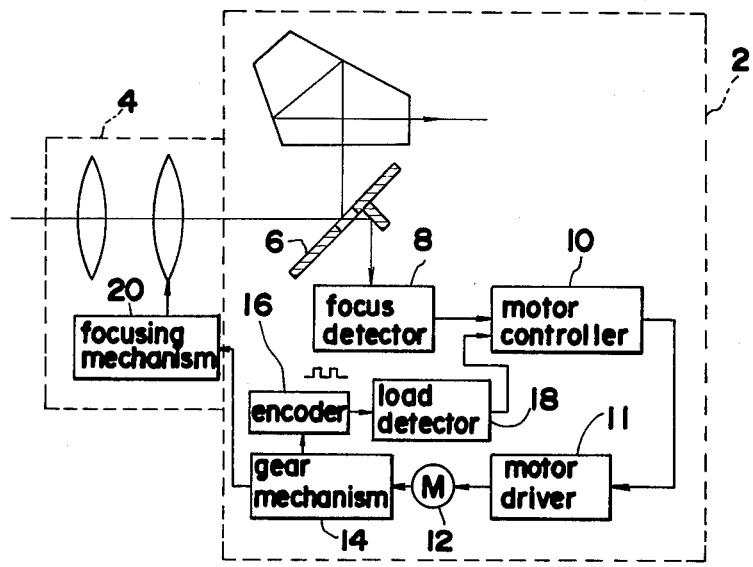
FIG. 1 is a block diagram showing an automatic focusing system according to an embodiment of the present invention.
Figure 3:
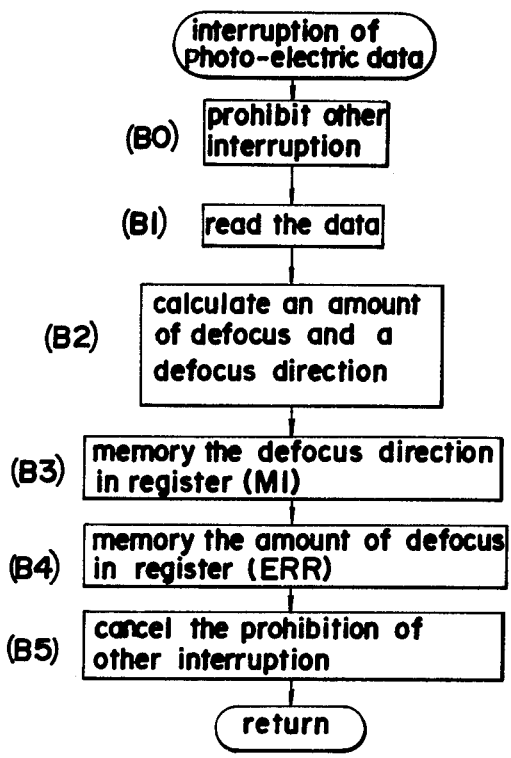
FIG. 2 through 4 are flowcharts respectively showing the operation of the system.
Figure 2:
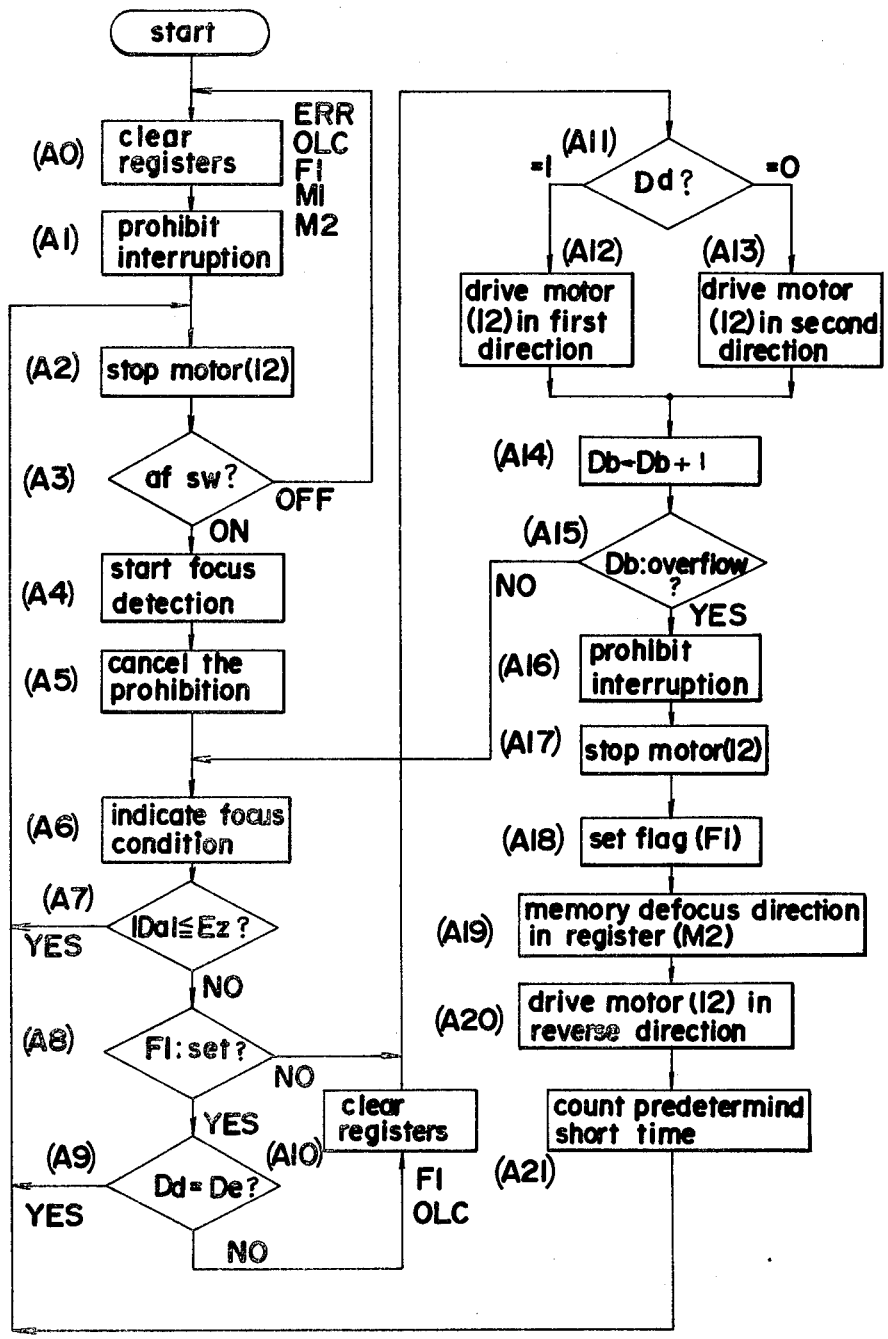
Figure 4:
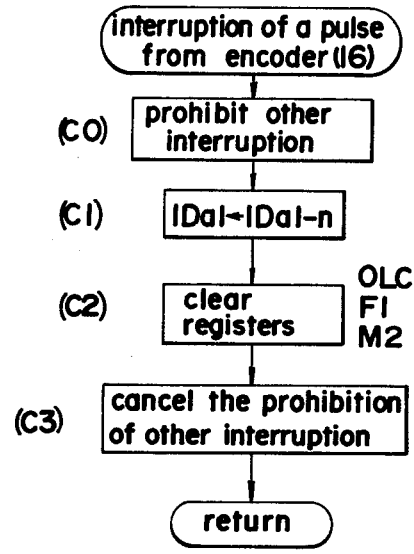

FIG. 1 shows in block diagram a camera automatic focusing device according to the present invention. With reference to the Figure, photographic or objective lens 4 is changeably mounted on camera body 2 and includes focusing mechanism 20 which is driven by a camera mechanism through a later-to-be-described interlocking mechanism to displace a focusing lens element along the optical axis of the photographic lens for desired focusing. The light coming from an object to be photographed and passing through photographic lens 4 is directed by mirror 6 to a viewfinder section and also traverses the light splitting portion formed at the central portion of mirror 6 to be directed to focus detector 8. The focus detector 8 comprises a photoelectric means disposed at a position optically equivalent to the film plane to receive the object light, and a data processing means which processes the photoelectric signal from the photoelectric means to generate a signal indicative of the focus condition of photographic lens 4, i.e. indicating whether photographic lens 4 is in a front focus condition or a rear focus condition. For focus detector 8, a focus detecting device may be employed which is shown for example in a U.S. Pat. No. 4,185,191 and which is provided with a pair of photodiode arrays to generate a defocus signal representative of the amount and direction of the defocus. The photoelectric means starts, upon receipt of a focus detection start signal as described later, to measure the object light and integrate the intensity of the object light for a given period, and generate, upon the completion of the integration, a first interruption signal for initiating the reading of the light measurement data. The interruption signal is generated at said given periods or at intervals commensurate with the brightness of the object. Following the predetermined flow chart, the data processing means reads the light measurement data from the photoelectric means and carries out predetermined calculations for the determination of the focusing condition. The direction of the defocus to be calculated indicates whether lens 4 is at a front focus condition or rear focus condition relative to the infocus condition where the lens focuses on a desired target object. The amount of defocus represents the amount of deviation or difference of the instantaneous focal plane of the lens 4 from a predetermined focal plane. In response to the defocus signal from focus detector 8 and a monitor signal from monitoring means described later, motor controller 10 generates a signal for controlling the driving of reversible motor 12. In response to the motor control signal, motor driver circuit 11 drives motor 12 to rotate it in a normal and reverse direction and stops the same. Gear mechanism 14 transmits the torque of motor 12 to focusing mechanism 20 to drive lens 4. Monitoring means (16) is associated with gear mechanism 14 to monitor in the camera whether the rotation of motor 12 is normally transmitted to focusing mechanism 20 for lens 4 or not. Monitoring means 16 comprises an encoder which generates a train of pulses with a frequency corresponding to a measure relating to the rotation of the gear mechanism, e.g. the rate of rotation, and which is arranged to generate a pulse for each rotation of the gear mechanism for a predetermined small angle. The pulse signal is also used as a second interruption signal described later. Further, the pulses correspond to the amount of movement of the focusing lens element by focusing mechanism 20 of lens 4 such that the amount of defocus is increased or decreased by a given amount for each pulse. When the focusing lens element is at the closest focusing position or at the infinity focusing position, the driving of the lens element beyond these positions is prevented and no pulse is generated from encoder 16. Overload detector 18 receives the train of pulses from encoder 16 and supplies to motor controller 10 a signal indicating whether the interval between pulse generations is within a given interval or not, i.e. representing whether the rotation of motor 12 is normally transmitted to lens 4. FIGS. 2 through 4 are flow charts showing the sequence of the operations of motor controller 10 and overload detector 18 which constitute essential parts of the present invention and which are composed of CPU, a microprocessor similar unit. Of the Figures, FIG. 2 chiefly shows the flow of motor controller 10 and FIGS. 3 and 4 show flows for focus detector 8 and overload detector 18 which are controlled independently of each other, interrupting the flow of FIG. 1. When either of the abovementioned two kinds of interruption signals is generated, the interrupting process of the flow shown in FIG. 3 or 4 is carried out in priority. In the flow of FIG. 2, step A0 is for setting an initial condition wherein all the registers ERR, OLC, F1, M1 and M2 are reset. Register ERR stores the data of the amount of defocus Da which is supplied from the data processing means of focus detector 8. Register OLC stores data of time measurement Db for determining the length of the interval of each two continuing ones of the pulses from encoder 16. Flag F1 stores data Dc which represents that focusing mechanism 20 of lens 4 is forcedly stopped in its movement by an overload. Register M1 stores the data indicative of the direction of defocus Dd which is provided from the processing means of focus detector 8, while register M2 stores the data De indicative of the direction of defocus at the time of the forceable stoppage of focusing mechanism 20 by the overload. Register ERR stores a logic "1" signal when the detected direction of defocus is front focus and a logic "0" signal for rear focus. Steps A1, A16, B0, C0 are for inhibiting the jumping to a corresponding step in response to the aforementioned interruption signal. This inhibition of interruption is released at steps A5, B5 and C3. Steps A3 is for detecting whether AF switch, which is manually opened and closed for the control of operation and inoperation of the focus detector, is open or closed. When switch AF is closed, a focus detection start signal is generated at the next step A4 so that focus detector 8 starts its focus detecting operation. At step A6, the data calculated in the flow of FIG. 3 described latter, e.g. the data representing the direction of defocus, is indicated in the viewfinder field of camera 2. At step A7, it is determined whether the data Da indicating the amount of defocus stored in register ERR is or is not more than a predetermined value Ez which represents the width of the in-focus range, i.e. it is determined whether the lens is within the infocus range or not. It is presumed here that the infocus range is given by a permitted width Ez of the range which extends on both sides of a central best focus position with the same width and in which the lens is assumed to be in focus. The value of Ez is determined necessarily in accordance with the f number of the lens, the accuracy or resolution of the focus detection, and the like. Step A11 is for reading the data representing the direction Dd of the defocus of which data was stored in register M1 at step B3 which will be described later on. At steps A12 and A13, a two-bit control signal e.g. (1.0) or (0.1) is applied to later-to-be-described motor driving circuit 11 and motor 12 is driven in the direction indicated by the read data. Step A15 is for detecting whether the count value in register OLC that was added in immediately before step A14, has overflown or not, i.e. whether the integration time relying on the time required for the execution of steps A6 through A15, exceeds a given time thereby obtaining information as to whether focusing mechanism 20 of lens 4 is in a over-load condition or not. It should be noted that the number of the bits of register OLC is determined such that the abovementioned given time is larger than the interval of pulses generated from encoder 16 at normal driving condition for lens 4. When the pulse interval exceeds the given time, a control signal of (1, 1) is applied to the motor driving circuit at step 17 to stop the driving of motor 12. The, flag F1 is set at step A18, and the data De, representing the direction of defocus, is stored in register M2 at step A19. Step A9 is for detecting whether the direction of defocus Dd at the time of over-load accurrence is equal or not to the direction of defocus De presented by resister M2 at the time when it is detected at step A8 that flag F1 has been set. Steps A20 and A21 are provided for swiftly releasing the abnormal engagement of gear mechanism 14 of camera 2 with focusing mechanism 20 of lens 4 due to the over-load of the latter. In these steps, motor 12 is driven pulsewisely in the reverse direction for a given short time.

The flow shown in FIG. 3 shows the operation of data processing means of focus detector wherein the direction and the amount of defocus are calculated in response to the first interruption signal which causes the reading of the light measurement data provided from photoelectric means within focus detector 8. First of all, at step B0, jumping to any other interruption flow is inhibited, and at step B1, the light measurement data from the photoelectric means is read. The direction and the amount of defocus is calculated based on the light measurement data at step B2. The data indicating the direction of defocus Dd is stored in register M1 at step B3, while the data of indicating the amount of defocus Da is stored in register ERR at step B4. Finally after the inhibition of interruption is released at step B5, the process returns to the flow of FIG. 2 thereby restarting the execution of the steps after that suspended by the aforementioned interruption process.

The flow in FIG. 4 is for refreshing the content in overload detector 18 at each generation of a pulse signal from encoder 16. First of all, jumping to the flow of the other interruption process is inhibitted at step C0 and the amount of defocus Da memorized in register ERR is subtracted by a given amount n at step C1. It should be noted that the given amount n has a value less than the aforementioned width Ez of the permissible infocus range. In this case, motor 12 continues to drive the lens towards its in-focus position. Then, at step C2, the contents of registers OLC, F1 and M2 are cleared. Finally, after the inhibition of interruption is released, the process returns to the flow of FIG. 2 to restart the execution of the steps after that suspended by the above interruption process.

Figure 5:
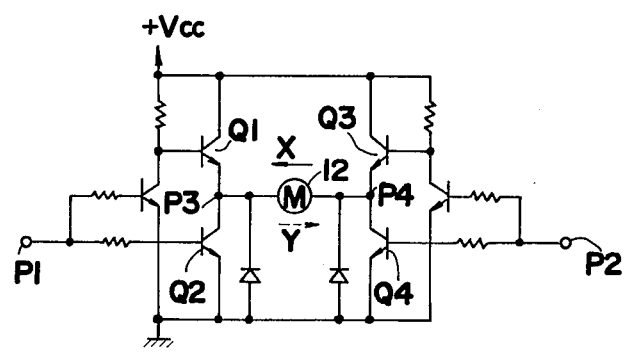
FIG. 5 is a circuit diagram showing the construction of a motor driver of the embodiment.

FIG. 5 shows an exemplary motor driving circuit 11 for driving motor 12. With reference to the Figure, motor drive transistor Q1 and Q2 are serially connected with a power source and rendered conductive and non-conductive by control signals of logic "0" or "1" applied to input terminal P1. Motor drive transistors Q3 and Q4 are also serially connected with the power source and rendered conductive and non-conductive by control signals of logic "0" or "1" applied to input terminal P2. Between the nodes P3 and P4 between respective pairs of transistors connected serially with each other, motor 12, which is driven in accordance with the two-bit signals applied to input terminals P1 and P2, is connected. When the aforementioned CPU outputs a two-bit signal of logic (1, 0) as a signal for driving the motor to move the focusing lens element towards the infinity focusing position, input terminal P1 receives a logic "1" signal and input terminal P2 receives a logic "0" signal to render transistors Q1 and Q4 non-conductive and transistor Q2 and Q3 conductive whereby motor 12 is supplied with current in the direction of arrow X and drives focusing mechanism 20 of lens 4 towards the infinity focusing position. When the control signal of logic (0, 1) is output, transistors Q1 and Q4 are rendered conductive while transistor Q2 and Q3 are rendered non-conductive whereby current flows through motor 12 in the direction of arrow Y to drive focusing mechanism 20 of lens 4 toward the closest focusing position. When a control signal of logic (1.1) is output from the CPU during the driving of motor 12 as described above, transistors Q1 and Q3 are rendered non-conductive while transistor Q2 and Q4 are rendered conductive to thereby short-circuit across motor 12 to rapidly stop the motor 12. When the control signal of logic (0,0) is generated in the aforementioned initial condition or stage, all transistors, Q1 through Q4, are non-conductive with no current being supplied to motor drive circuit 11 so that motor 12 remains stopped.

Figure 6:
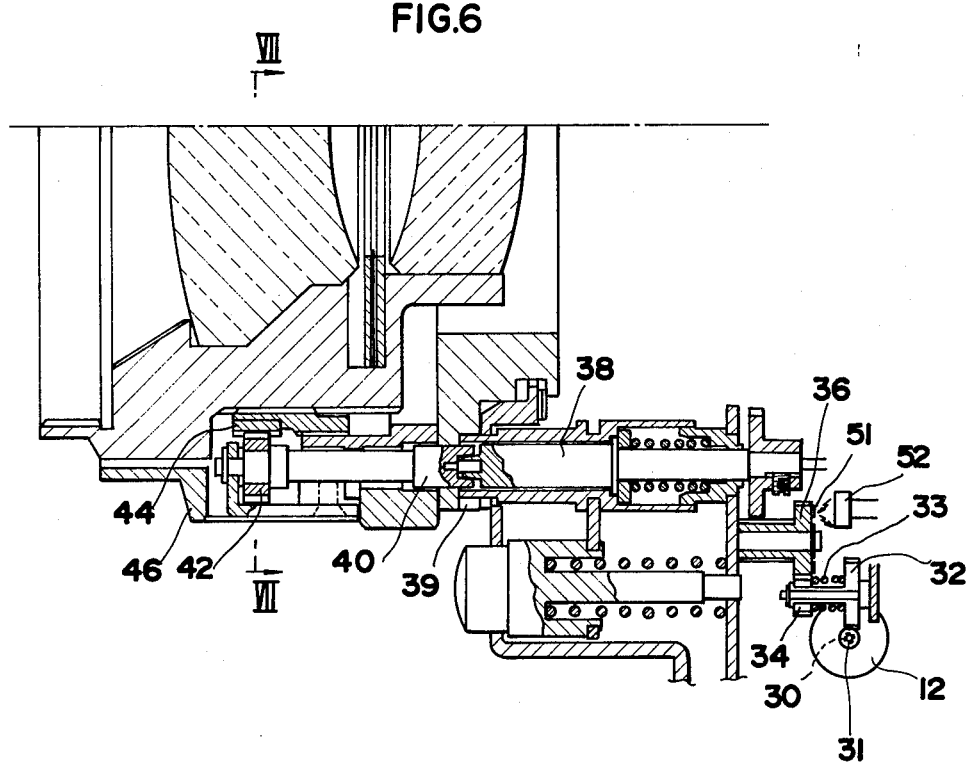
FIG. 6 is a cross-sectional view showing the interlocking mechanism between the camera body and the objective lens.
Figure 7:
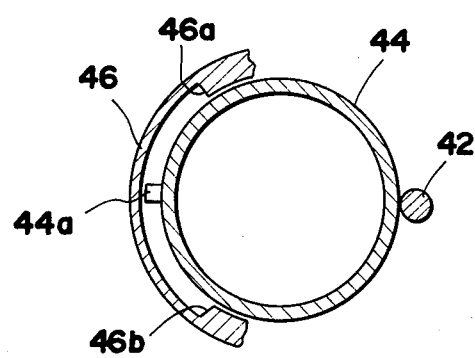
FIG. 7 is a partial vertical sectional view showing a movement-prevention mechanism for the focusing lens element in the objective lens.

FIG. 6 is a vertical sectional view showing the essential portion of the driving mechanism 14 in camera 2 and focusing mechanism 20 in lens 4, while FIG. 7 is a cross sectional view of the essential part of lens 4. FIG. 6 shows only the lower half of lens 4 for the convenience of illustration and understanding. FIG. 7 shows the cross section taken along VII—VII in FIG. 6. With reference to FIG. 6, motor 12 is disposed at the bottom of the mirror box of a single lens reflex camera, with its rotational axis being normal to the optical axis of the lens. Worm wheel 32 constitutes a worm gear mechanism together with worm 30 formed at the end portion of shaft 31 of motor 12. The worm gear mechanism serves to change the axis of rotation in the transmission by 90° so that the driving axis in the output of the camera extends in parallel with the optical axis of the lens. The mechanism also reduces the rotational speed of motor 12 greatly. On the shaft of worm wheel 32 is mounted transmission gear 34 which is friction coupled with worm wheel 32 through spring 33 to follow the rotation of worm wheel 34. The friction coupling functions such that when the driving torque is small as in the case where focusing mechanism 20 of lens 4 is normally driven through gears and coupler described later, the rotation of worm wheel 32 is directly transmitted to transmission gear 34, and when the driving torque increases due to an overload in the lens mechanism in lens 4, the friction coupling is overriden and worm wheel 32 rotates idly with transmission gear 34 stopping. The rotation of transmission gear 34 is transmitted through gears 36 and 37 to coupler 38 which projects forwardly from mount plane 39 of camera 2. To motor 12 is supplied the current of, e.g. about 0.5A for the normal driving operation and about 1A at the time of overload.

Encoder 16 is composed of a plurality of reflectors 51 which are arranged concentrically at equal angular spaces on gear 36, and a photo-coupler 52 consisting of a light emitter which emits a light, e.g. infrared light to one of the reflector 51 and a light receiver which is arranged integrally with the light emitter and receives the light reflected from the reflector. Encoder 16 monitors the rotation of gear 36 and substantially generates pulses periodically when the driving torque of motor 12 is normally transmitted to focusing mechanism 20 of lens 4. Encoder 16 stops the generation of the pulses when the focusing mechanism in the lens is forced to stop by an overload thereto. It should be understood that encoder 16 may be provided at any one of gears 34 and 36 and coupler 38 of the driving section. Coupler 38 of camera 2 and coupler 40 of lens 4 constitutes a known coupling mechanism of a known dog or claw clutch which links the driving section 14 of camera 2 with focusing mechanism 20 of lens 4. At the other end of coupler 40 is fixedly mounted gear 42 through which the rotation of coupler 40 is transmitted to gear 44 which is linked with the helicoid screw mechanism of lens 4, so that the focusing lens element is driven back and forth along the optical axis of lens 4. Gear 44 has been formed with a projection 44a which is limited as to its range of angular movement by infinity side stopper 46a and the closest side stopper 46b. When projection 44a comes into abutment with infinity side stopper 46a, lens 4 is focused on an infinity point. While when projection 44a comes into abutment with the closest side stopper 46b, lens 4 is focused on a closest distance within the focusable range of the camera-to-object distance.

Now, explanation will be given about the operation of the camera's automatic focusing device according to the present invention, with reference to FIGS. 1 through 7. Let's assume that the AF switch is open and the focusing lens element is at an intermediate position between the infinity and closest focus positions. In such an initial condition, all the registers, ERR, OLC, F1, M1 and M2, have been cleared, interruption is inhibited, motor 12 remains stopped, and the CPU is in a waiting condition to repeat steps A0 through A3 until the AF switch is closed. When the AF switch is manually closed, a focus detection start signal is generated so that the photoelectric means of focus detector 8 starts light measurement with the inhibition of interruption being released. When a light measuring operation is completed in the photoelectric means after the start of the measurement, an interruption signal is generated for initiating the reading of the light measurement data. When the interruption signal is generated during the execution of step A6, the process jumps to step B0 after the completion of the execution of step A6. In this case, as motor 12 remains stopped with no pulse generated from encoder 16, steps from A2 to A7 are repeated until a light measurement is completed. In the flow of FIG. 3, a light measurement datum is read; the direction Dd and amount Da of defocus are calculated; their data are stored in respective registers M1 and ERR, and the interruption process for reading light measurement data is terminated. Upon termination of the interruption process, step A7 is executed and the execution of the flow of FIG. 2 is continued.

At step 7, the amount of defocus Da calculated as mentioned above is compared with the width of infocus permissible range Ez. When the amount of defocus Da is within infocus permissible range Ez, it is determined that the position of the lens is within an infocus range, and the process jumps to step A2 to leave motor 12 stopped. On the contrary, when the amount of defocus Da is out of the infocus permissible range, it is determined that the lens is in front focus condition or rear focus condition, and the next step A8 is executed. At this time, as flange (F1) was cleared at step A0 and is left cleared, the process jumps to step A11. In accordance with the direction of defocus Dd indicated by the datum in register M1 which datum was obtained in the interruption process for the light measurement, a motor driving signal of logic (1, 0) or (0, 1) is applied to motor driving circuit 11, at step A12 or A13, to drive lens (4) towards its infocus position. With this signal application, motor 12 starts to rotate and drives focusing lens element of lens 4 through the driving mechanism. Then, at step 14, the count Db of register OLC is added by "1". Thus, steps from A6 to A15 are repeated until the count Db in register OLC overflows, thereby metering the time that is compared with the interval to the next pulse generation from encoder 16 in response to the rotation of the motor. The rotation of motor 12 is transmitted through worm wheel 32 to transmission gear 34, frictionablly coupled thereto, and rotates gear 36, couplers 38 and 40, and gears 42 and 44. Monitoring the rotation of gear 36, encoder 16 generates a pulse signal within the given time and the process jumps to step Co, in the flow of FIG. 4, after the completion of the execution of steps A6 to A15 that are being executed at the generation of the pulse signal. It should be understood that when the first interruption signal is generated from the photoelectric means of focus detector 8 before the pulse signal is generated, the interruption process for light measurement shown by the flow in FIG. 3 generates new signals for the direction and amount of defocus. Returning back to the flow of FIG. 4, the amount of defocus Da stored in register ERR is decreased by "n" at step C1 registers F1 and M2 are cleared and the second interruption process is terminated. Upon the termination of the second interruption process, the execution of the flow in FIG. 2 is continued. The pulse signals are substantially generated periodically so long as the focusing lens element in lens 4 is normally driven.

Thus, while the steps A6 to A15 in the flow of FIG. 2 are being repeated, focusing lens element of lens 4 is driven towards its infocus position and, simultaneously therewith, the corresponding flow of interruption process is executed in response to the first interruption signal from the photoelectric means in focus detector 8 and the second interruption signal from encoder 16.

Then, when the amount of defocus Da calculated at step B2 or C1 comes to fall within permitted infocus range Ez, it is determined at step A7 that the lens is within an infocus range, and a motor stop signal or logic (1, 1) is applied to motor driving circuit 11 to rapidly stop motor 12 with an indication of infocus being made in the camera view finder.

The above description is about the case wherein focusing lens element of lens 4 is normally driven without being subject to overload and the lens is brought into an infocus condition before the element reaches either the infinity focusing position or the closest focusing position. In the following, explanation will be made about the case wherein focusing lens element of lens 4 is subject to overload. The overload will occur in the cases (a) wherein the anticipated infocus position of the focusing lens element is beyond its closest focusible position, (b) wherein the anticipated focusing position of focusing lens element is beyond the infinity focusable position where the lens focuses in infinity focusing condition in close-up photography, (c) where the user inadvertently seizes by his or her hand the focusing ring adapted for manual focusing to forcedly block the operation of focusing lens element 20, and wherein the coupling mechanism between camera 2 and lens 4 or focusing mechanism of lens 4 gets out of order and becomes inoperable. In the following description, the operation is explained for the case (A), as an example, wherein the anticipated focusing position is beyond the closest focusable position of focusing lens element.

When the object point is closer to the camera than the closest focusable distance of lens 4, focusing lens element 20 is driven to its closest focusing position whereupon projection 44a of gear 44 comes into abutment with closest end stopper 46b of lens barrel 46. However, at that time, the amount of defocus Da is still outside of the permitted infocus range Ez so that a driving signal of logic (0, 1) for driving towards a closer focusing position is still generated and supplied to motor driving circuit 11. Accordingly, although motor 12 continues to rotate, it becomes impossible to drive focusing lens element further so that coupler 40, and gears 42 and 44 stop their rotation, resulting in the stoppage of rotation of coupler 38 and gears 36 and 34 of the gear mechanism in camera 2. Hence, the stoppage of the rotation of transmission gear 34 rapidly increases the driving torque of worm wheel 32 beyond a given value whereby the friction coupling between transmission gear 34 and worm wheel 32 is overridden or released. At this stage, only motor 12, worm 30 and worm wheel 32 continue to rotate while encoder 16 for monitoring the rotation of transmission gear 34 starts to generate a no pulse signal. It should be understood that motor 12, at that time, consumes current twice as much as that at the normal driving state. At the time when focusing lens element of lens 4 has been driven to its closest focusing position, steps A6 to A15 are repeated with the count Db in register OLC increasing incrementally. As the pulse signal from encoder 16 for resetting the count Db in register OLC can not be generated as explained above, the increasing of the count continues until the count overflows. Then, the overflow is detected at step 14 and motor driving circuit 11 is applied with a motor stop signal of logic (1, 1) with flag F1 being set and the direction of defocus De at that time being memorized in register M2.

Upon stoppage of motor 11, worm 30 and worm wheel 31 stop their rotation. However, at that time, due to the overload mentioned above, the worm wheel is in firm wedge-engagement with worm 30 so that a large torque will be required for releasing the engagement upon reverse driving of motor 12. The time for such extra motor driving for releasing the engagement will be required, for example, in the case when focus detection and automatic focusing is made again by the camera being brought away from the prohibited target object. To eliminate such a time, the present embodiment is arranged such that the wedge-engagement is released immediately after the motor stoppage. That is, at steps A20 and A21, a reverse driving signal of logic (1, 0) is applied to motor driving circuit 11 to drive the motor in the reverse direction for a given short period, e.g. 3 millisecond to a value a little longer than the time necessary for releasing the wedge engagement. The given short period may have such a length necessary for driving motor 12 to release the engagement and rotate gears 34 to 42 for the angles of the play therebetween. Otherwise, the motor drive control circuit may be arranged such that motor 12 is stopped when the count of the number of pulses from encoder 16 reaches a value corresponding to the amount of drive of the gear mechanism necessary for releasing the wedge-engagement and driving gears 34 to 42 for angles of play therebetween.

Following the set of flag F1, memorization occurs in register M2 of the direction of defocus, i.e. the direction of motor drive at the time of over-load, and reverse driving of motor 12, the process from step A2 are executed. At step A2, an indication of out-of-focus is made in the camera viewfinder. Instead, the embodiment may be modified to positively indicate the stoppage of motor 12 due to the overload. Returning back to the process, as the amount of defocus Da is outside of permitted infocus range Ez with flag F1 being set, it is judged at step 9 whether the directions of defocus indicated by the outputs of registers M1 and M2 are identical to each other or not. In the case being discussed, the directions are identical to each other, and the process jumps to step A2 whereafter steps A2 to A9 are repeated. When the user, observing the viewfinder indication, resets the camera-to-object distance by displacing the camera position or the object, and actuates the automatic focusing system, photoelectric means of focus detector 8 generates a first interruption signal to that new direction and amount of defocus for the reset distance are calculated. In this case, the calculated direction of defocus Dd indicates for driving focusing lens element towards an infinity focusing position which is opposite to the direction memorized in register M2. Therefore, any coinciding of directions of defocus are detected at step A9 and processes from step A11 are executed after flag F1 and register OLC have been cleared. Thus, motor driving circuit 11 is supplied with such a motor driving signal as to drive focusing lens element of lens 4, in accordance with the above calculated direction of defocus. In response to the signal, motor driving circuit 11 starts to drive motor 12 smoothly and swiftly, because the wedge-engagement has been released as explained above.

In the case where the anticipated infocus position for closeup photography is beyond the infinity focusing position of focusing lens element, or the case where the user inadvertently seizes, by hand, the focusing ring for manual focusing to forcedly restrain the focusing lens element, smooth and swift focusing can be made through processes substantially the same as those described above. It is to be noted that although the above embodiment was arranged such that the photoelectric means of focus detector 8 periodically generates light measurement data which are utilized as first interruption signals, the embodiment may be modified such that the photoelectric means continuously generates light measurement data with subsequent stages periodically reading the data.

Figure 8:
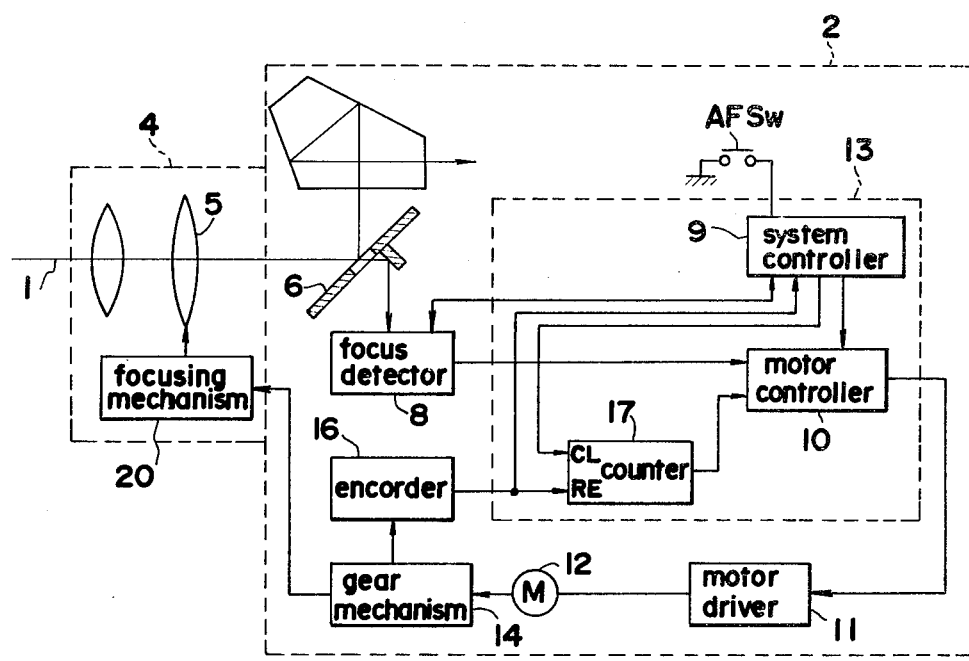
FIGS. 8, 9 and 10 are block diagrams showing other embodiments.

FIG. 8 is a block diagram showing the arrangement of another detection means for detecting the lens overload condition in accordance with the present invention. In the Figure, like reference characters are used for elements similar to those of FIG. 1. With reference to FIG. 8, photographic lens 4 is detachably mounted on camera body 2. The focusing mechanism 20 within lens 4 receives driving force through the coupling mechanism from the driving mechanism of camera body 2 as described hereinafter, and drives focusing lens element 5 along the optical axis of photographic lens 4. The light of a target object (object light) passing through lens 4, in part, is introduced by mirror 6 to the camera viewfinder optical system and in part traverses the semitransparent portion of mirror 6 to be directed to focus detector 8. Focus detector 8 includes a photoelectric means disposed at a position that is optically equivalent to the film plane. Focus detector 8 has a construction such as shown in U.S. Pat. No. 4,185,191 and generates a signal representative of the direction and amount of defocus of photographic lens 4. Focus detector 8 responds to a starting signal from a system controller 9 described later such that its photoelectric means starts integration of measured light intensity and, upon completion of the integration, transmits photoelectric data to data processing means in focus detector 8. Upon the transmission, a signal is generated from focus detector 8. The signal is used as the aforementioned first interruption signal in the case when the circuit portion surrounded by broken line 13 is composed of a microprocessor. The data processing means calculate direction of and the amount of defocus based on the photoelectric data and generates signals representing the calculated direction and amount of defocus. Motor controller 10 receives the defocus signal from focus detector 8 as well as pulse signal from encoder 16 and counter 17 described later, and generates a motor control signal for controlling the rotation of motor 12. Motor driver 11 controls the current motor 12 in response to the motor control signal from motor controller 10. Gear mechanism of transmission mechanism 14 includes a reduction gear mechanism and transmits the torque of motor 12 to focusing mechanism 20 in lens 4. Encoder 16 serves as the aforementioned monitor means and is associated with gear mechanism 14 to generate a train of pulses of a frequency relying on the rate of rotation of, for example gear 36 of gear mechanism. The pulses generated by encoder 16 are applied to reset terminal RE of counter 17 and to system controller 9. Counter 17 functions as a timer for metering a given time from its resetting and as means for detecting the relationship of the length between the given time and each interval of adjoining pulses from encoder 16 to thereby detect whether lens 4 is normally driven or blocked. Counter 7 is applied at its clock input terminal CL with pulses having shorter period than that of the pulses generated from encoder 16. Immediately after being reset by the pulse from encoder 16, counter 17 starts to count the number of pulses applied to its clock terminal and generates an overflow pulse from its output terminal when it counts a given number N before it is reset with a pulse from encoder 16 being applied again to its reset terminal. The time required for counting the number N of pulses is equal to the given time and the counted time is set to be longer than the interval of each adjoining pulses generated from encoder 16 at the time when focusing lens element 5 is normally displaced by motor 12. Accordingly, during the normal driving of focusing lens element 5, counter 17 is reset by the pulse from encoder 16 before it counts up N number of pulses, thereby generating no overflow signal. At a state where focusing lens element 5 has reached its closest focusing position and is prevented by a stopper mechanism in the lens barrel from moving further to a closer focusing position against the tendency of motor 12 to drive focusing lens element beyond the stopped position, or where focusing lens element has reached its infinity focusing position to be prevented by a prevention mechanism from moving further beyond the stopped position in the direction of increasing the distance to be focused but the motor tends to displace the focusing lens element in the focused distance increasing direction, gear 36 in gear mechanism 14 is forcedly stopped so that encoder 16 generates no pulse. In such a case, counter 17, being not reset, counts the number of pulses from system controller 9 up to the full number N, and generates an overflow pulse. As is apparent from the above description, the overflow pulse represents the drive impossible condition of the focusing lens element. Motor controller 10, in response to the overflow signal applied thereto, generates such a control signal as to interrupt the power supply to motor 12.

System controller 9 is actuated by the closure of manually operated automatic focusing initiation switch (AF SW) and generates timing signals required for the sequential operation of the whole circuitry, as well as processes information such as a judgement of whether the amount of defocus is within the infocus range.

Figure 9:
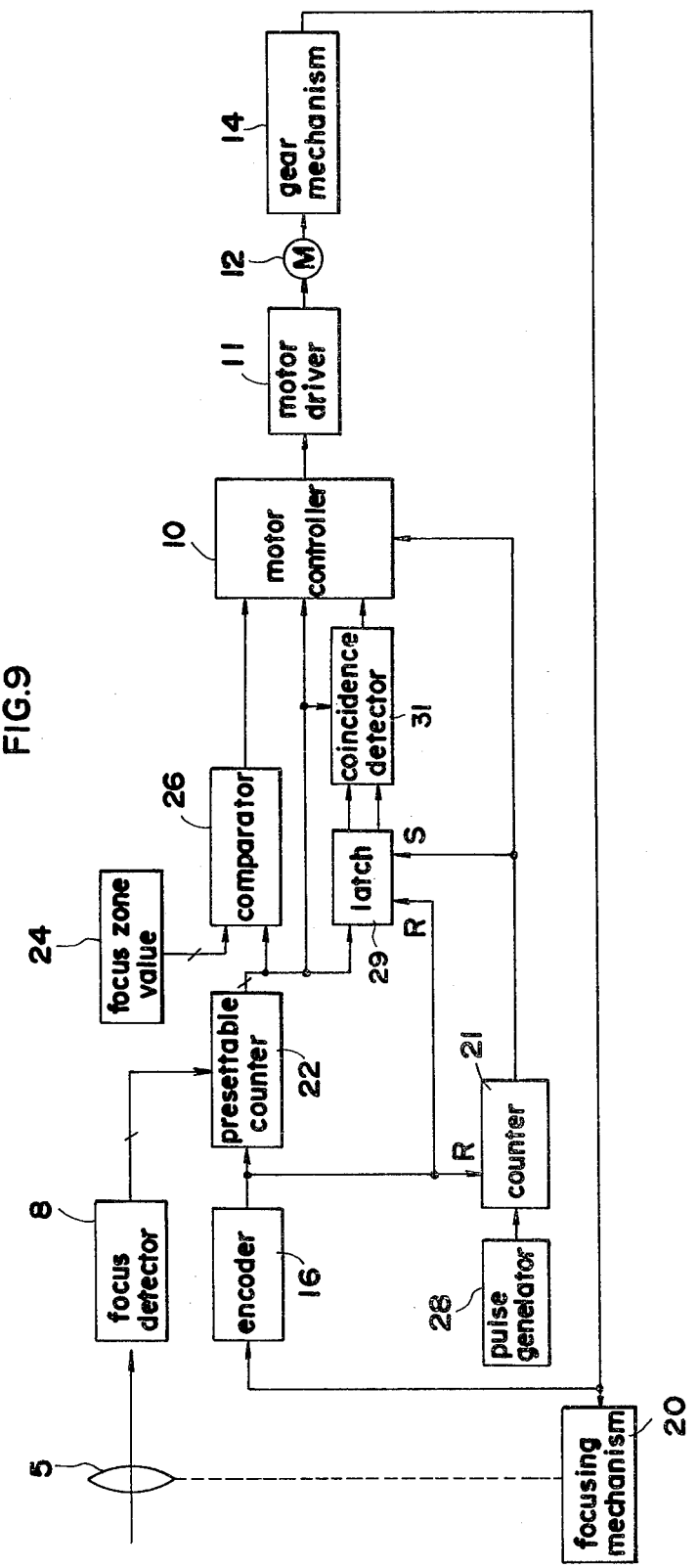

FIG. 9 shows an exemplary circuit construction of the focus judging portion of the above described automatic focusing device. With reference to FIG. 9, preset-table counter 22 is preset therein with the defocus signal when the latter is generated by focus detector 8 and then counts down from the preset signal the number of pulses from encoder 16. In this case, it is assumed that the amount of the displacement of the focusing lens element corresponding to the interval of adjoining pulses from encoder 16 is made to be commensurate with the unit of the amount of defocus represented by the signal generated from focus detector 8. Additionally, the signal representing the direction of defocus is a logic "1" for a front focus condition and a logic "0" for a rear focus condition and stored at the most significant bit (MSB) of counter 22. The signal representing the amount of defocus is stored in the bits of counter 22 other than the MSB. The signal of the amount of defocus stored in counter 22 is applied to comparator 26 which compares the signal of the amount of defocus with the signal previously set in register 24 and representing the permissible width Ez of infocus range. If the amount of defocus is within the permissible width Ez, comparator 26 generates a logic "0" signal, which in turn is applied to one of the input terminals of motor controller 10 to interrupt the power supply of motor 12 and stop the rotation of the latter. On the contrary, when the amount of defocus is out of permissible width Ez, comparator 26 generates a logic "1" signal which in turn is applied to motor controller 10 to continue the rotation of motor 12. The signal stored at MSB of counter, i.e. the signal representing the direction of defocus is applied respectively to the other input terminal of motor controller 10, and to one of the input terminals of latch circuit 29 and one of the input terminals of coincidence detection circuit 31.

Pulse generator 28 generates a train of pulses of a predetermined fixed frequency and the number of the pulses is counted by counter 21, which starts its pulse counting upon reset thereof by the pulse from encoder 16 and generates an overflow pulse from its output terminal when it counts the pulses to a given number N before it is again reset by the pulse from encoder 16. The overflow signal is applied to the set terminal of latch circuit 29 and to the other input terminal of motor controller 10. Immediately after the receipt of the overflow pulse, motor controller 10 stops the power supply to motor 12. The output of encoder 16 is also applied to reset terminal of latch circuit 29. When set by the overflow pulse from counter 21, latch circuit 29 latches the signal of the direction of defocus at that time, and generates its stored signal from one of the output terminals. The output signals of latch circuit 29 is applied to one of the input terminals of coincidence detection circuit 31. At this time, from the other output terminal of latch circuit 29 a logic "1" signal is generated indicating the latching condition. The logic "1" signal is applied to the other input terminal of coincidence detection circuit 31. When the input signal to the input terminal is a logic "1" representing the latching condition, coincidence detection circuit 31 compares the signal of the direction of defocus input from counter 22 with the latched signal of the direction of defocus. When both signals are the same, it represents the condition wherein the latch circuit is not reset, the focusing lens element is not displaced and the motor is stopped with the amount of defocus not changed. Then, the output of coincidence detection circuit 31 is applied to the other input terminal of motor controller 10 to maintain the motor stopped condition. On the contrary, if the newest signal of the direction of defocus becomes different from the latched signal of the direction of defocus due to the change of the camera-to-object distance by the user changing the camera direction and the object to be measured, coincidence detection circuit 31 detects incoincidence and transmits a signal representing it, to input terminal of motor controller 10 which thereby rotates motor 12 again in accordance with the newest signal applied to the other input terminal and representing the last detected direction of defocus.

With the construction of the above embodiment, the automatic focusing can be effected when the user changes the direction of camera shooting after recognizing the stoppage of the motor. When a microcomputer is employed for the above embodiment, the microprocessor of the computer may be programmed to perform the functions of presettable counter 22, counter 18, register 24, comparator 26, motor controller 10 and pulse generator shown in FIG. 9 and means for sequentially controlling them (not shown).

Figure 10:
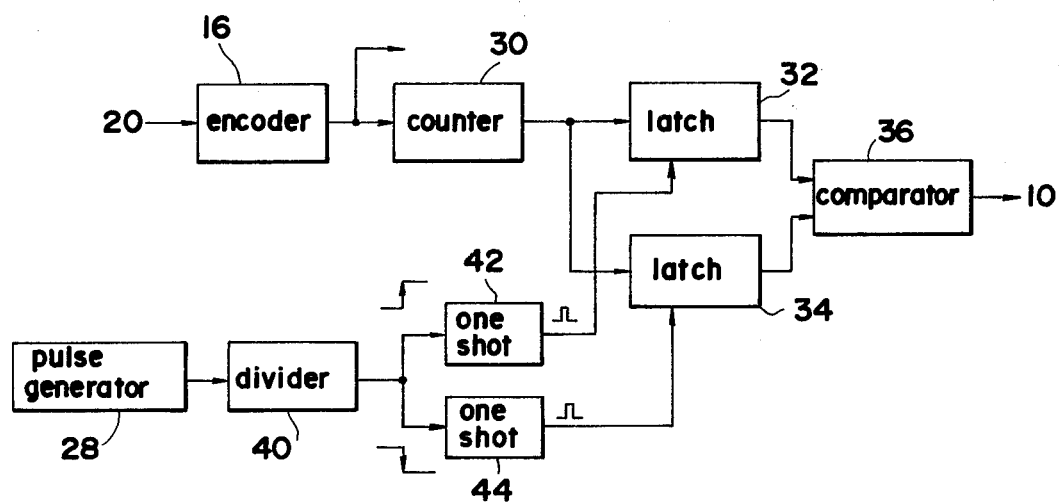

FIG. 10 shows still another modification of detection means for detecting the lens drive impossible condition. With reference to FIG. 10, counter 30 counts the number of pulses supplied from encoder 16. The counted value of counter 30 is, at each given interval, latched in latch circuits 32 and 34. At each time when the latching is made, comparator 36 compares the contents of latch circuits 32 and 34 and generates a lens drive impossible signal when the contents are coincident to each other. Pulse generator 28, frequency devider 40 and one-shot circuits 42 and 44 compose a circuit for supplying latch pulses alternatively to latch circuits 32 and 34. One-shot circuit 42 responds to the positive edge of the output of frequency divider 40 to generate a single pulse, while one-shot circuit 44 responds to the negative edge of the same to generate a single pulse. Frequency divider 40 divides the frequency of the clock pulse from pulse generator 38 and alternatively generates logic "1" and "0" signals. When a pulse is applied to counter 30 from encoder 16 while the output of the frequency divider is maintained at either logic "1" or "0", the contents in latches 32 and 34 differ from each other at the time when the output of frequency divider changes. Such a condition is regarded as indicating that the photographic lens is normally driven.

What is claimed is:

1. An automatic focusing device in a camera body capable of being coupled with an objective lens which is mountable on the camera body and which has a focusing lens unit movable along an optical axis of the objective lens by a focusing mechanism for focusing and which further has means for preventing the focusing lens unit from moving beyond either an infinity focusing position or its closest focusing position, said automatic focusing device comprising:

means for detecting the focusing condition of the objective lens relative to an object and producing a defocus signal indicating at least the defocus direction of the focusing lens unit with respect to its in-focus condition;

means for driving the focusing lens unit in a predetermined direction in response to said defocus signal;

means for transmitting the driving force of said driving means to the focusing mechanism provided in the objective lens in order to move the focusing lens unit along the optical axis for focusing;

means for detecting any overload condition in which the load for said driving means is increased over a predetermined level to produce an overload signal when the overload condition is detected;

means for interrupting the driving force to said driving means in response to said overload signal;

means for storing said defocus signal when said overload condition is detected, and means for comparing a second defocus signal from said focusing condition detecting means with said stored defocus signal, whereby, if the second defocus signal is different from the stored one, said driving means is actuated for starting to drive the focusing lens unit in correspondence with the second defocus signal.

2. An automatic focusing device as set forth in claim 1, wherein said overload condition detecting means further includes means for producing a train of pulses whose frequency corresponds to the amount of axial movement of said focusing lens unit, means for measuring each interval between two successive pulses, and means for comparing each interval with a predetermined period to produce said overload signal when the measured interval is longer than said predetermined period.

3. The invention of claim 1 wherein said means for comparing said defocus signals will only drive said focusing lens unit in a direction opposite to the limit of movement indicated by said first defocus signal.

4. An automatic focusing device as set forth in claim 2, wherein said train of pulses producing means includes and encoder which generates a train of pulses whose frequency corresponds to the amount of movement of a member which is interlocked to said focusing lens unit for transmitting the driving force of said driving means to said focusing mechanism of said focusing lens unit.

5. An automatic focusing device as set forth in claim 2, wherein both of said interval measuring means and said comparing means include a counter which is reset by an input of one of said pulses from said train of pulse producing means and which counts up the number of pulses of constant frequency to produce said overload signal if the counted number reaches a predetermined number.

6. An automatic focusing device as set forth in claim 2, wherein said focusing condition detecting means produces a defocus signal indicating the amount of defocus and the defocus direction, and said automatic focusing device further comprises means for counting down, from the number corresponding to said amount of defocus, the number corresponding to the number of pulses produced from said train of pulses producing means to output a counted signal indicating the counted result, means for outputting an in-focus range signal which represents an in-focus permissible range of the focusing lens unit, and means for comparing said counted signal with said in-focus range signal to produce a stop signal for interrupting the driving of said driving means if the counted number reaches an in-focus permissible range.

7. An automatic focusing device as set forth in claim 1, wherein said driving means includes a reversible motor for moving the focusing lens unit, means for controlling the rotation of the motor to generate a control signal which indicates rotational direction of the motor, and means for driving the motor in accordance with said control signal.

8. An automatic focusing device as set forth in claim 7, wherein said controlling means is constructed so as to rotate the motor in the opposite direction with respect to the direction when the focusing lens element is prevented from axial movement by said preventing means.

9. An automatic focusing device as set forth in claim 1, wherein said transmitting means includes a clutch mechanism which is disengaged when said driving means is loaded over said predetermined level.

10. An automatic focusing device in a camera body capable of being coupled with an objective lens which is mountable on the camera body and which has a focusing lens unit movable along an optical axis of the objective lens by a focusing mechanism for focusing and which further has means for preventing the focusing lens unit from moving beyond either an infinity focusing position or its closest focusing position, said automatic focusing device comprising:

means for detecting the focusing condition of the objective lens relative to an object and producing a defocus signal indicating at least the defocus direction of the focusing lens unit with respect to its in-focus condition;

means for driving the focusing lens unit in a predetermined direction in response to said defocus signal;

means for transmitting the driving force of said driving means to the focusing mechanism provided in the objective lens in order to move the focusing lens unit along the optical axis for focusing, and means for detecting any overload condition in which the load for said driving means is increased over a predetermined level to produce an overload signal when the overload condition is detected, including means for producing a train of pulses whose frequency corresponds to the amount of axial movement of said focusing lens unit, means for counting the number of said pulses from said train of pulses and producing a signal indicating the counted number, first means for storing said signal at a predetermined period after said first storage operation is completed, and means for comparing the signals stored in said first and second storing means with each other to produce said overload condition signal if the compared signals are coincident with each other.

11. An automatic focusing device as set forth in claim 10, further comprising means for generating clock pulses whose frequency is constant, means for dividing the frequency of said clock pulses, means for resetting said first storing means in response to each positive edge of the output of said frequency dividing means, and means for resetting said second storing means in response to each negative edge of output of said frequency dividing means.

12. An automatic focusing device in a camera body capable of being coupled with an objective lens which is mountable on the camera body and which has a focusing lens unit movable along an optical axis of the objective lens by a focusing mechanism for focusing and which further has means for preventing the focusing lens unit from moving beyond certain predetermined focusing positions, said automatic focusing device comprising:

means for detecting the focusing condition of the objective lens relative to an object and producing a defocus signal indicating at least the defocus direction of the focusing lens unit with respect to its in-focus condition;

means for driving the focusing lens unit in a predetermined direction in response to said defocus signal;

means for transmitting the driving force of said driving means to the focusing mechanism provided in the objective lens in order to move the focusing lens unit along the optical axis for focusing;

means for detecting any overload condition in which a power load on said driving means is increased over a predetermined level to produce an overload signal when the overload condition is detected;

means for interrupting the driving force to said driving means in response to said overload signal, and means for automatically driving said focusing mechanism in a reverse direction for a limited predetermined time to release any friction engagement of said focusing mechanism at the limit of its range of movement whereby reactivation of said focusing mechanism in a subsequent focusing mode of operation will not require an abnormal driving force.

* * * * *